United States Patent Office 3,466,871
Patented Sept. 16, 1969

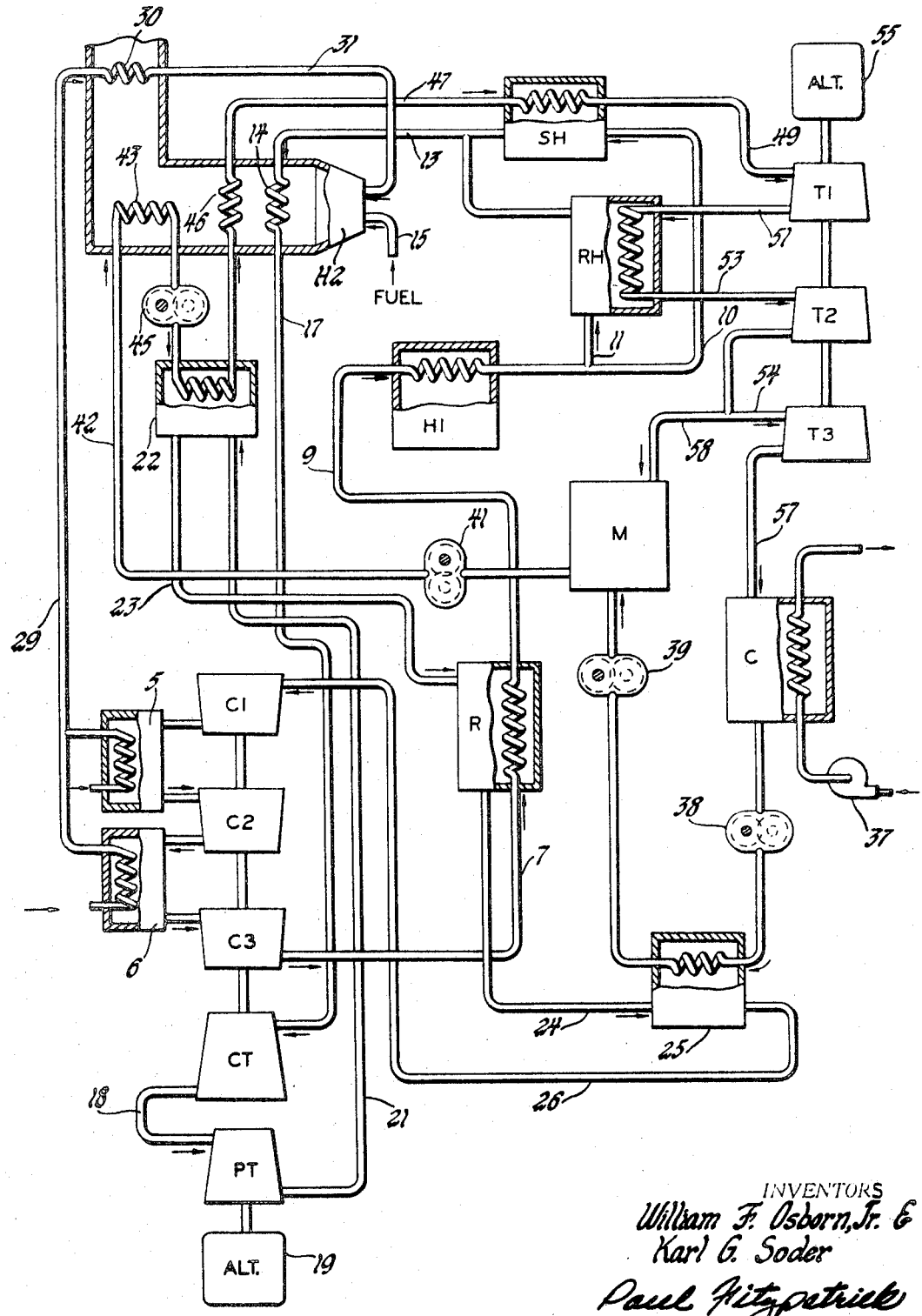

3,466,871
TURBINE POWER PLANT
William F. Osborn, Jr., Brownsburg, and Karl G. Soder, Indianapolis, Ind., assignors to General Motors Corporation, Detroit, Mich., a corporation of Delaware
Filed Apr. 7, 1967, Ser. No. 629,272
Int. Cl. F01k 23/16; F01d 13/02
U.S. Cl. 60—67                                11 Claims

ABSTRACT OF THE DISCLOSURE

A power plant embodying a closed circuit gas turbine plant and a steam turbine plant, both delivering work. A low-temperature heater preheats the helium which is further heated in a fueled heater; the fueled heater also is an evaporator. Heat is rejected from helium to water and steam at several points in the two cycles.

---

Our invention relates to turbine power plants employing both a gas cycle and a vapor cycle and is directed particularly to such a plant providing for rejection of heat from the gas to the vapor cycle so as to provide exceptionally high thermal efficiency.

In its preferred embodiment, our power plant includes a closed helium circuit gas turbine plant and a superheated condensing steam turbine plant. It embodies a first heater, which is preferably a nuclear reactor, but may be some other heat source which has a relatively low maximum temperature, and a second heater which is fuel fired and is capable of raising the working medium to a higher temperature than the first heater. The helium in the first circuit, after passing through the first heater, is used to superheat and, preferably, to reheat steam in the second cycle, is heated to the maximum system temperature in the second heater, is expanded through a turbine, rejects heat to the feed water in the steam circuit, and is returned to the first heater through compressors driven by the gas turbine. A regenerator provides for transfer of heat from the expanded gas to the compressed gas. In addition to what has been outlined above, the preferred steam cycle includes a preheater and a vaporizer in the fueled heater, turbines through which the steam is expanded, and a condenser. Both the steam and gas turbines perform useful work, as by driving alternators.

The nature and advantages of our invention will be apparent to those skilled in the art from the succeeding detailed description of the preferred embodiment and the accompanying drawing which is a schematic diagram thereof.

The gas, Brayton or Joule cycle part of the power plant comprises series compressors C1, C2, and C3 connected by shafting to a compressor driving gas turbine CT. The compressors are connected by intercoolers 5 and 6. The high pressure compressor C3 discharges through the heating pass of a regenerator R to a first heater H1. This heater may be a nuclear reactor having a relatively low temperature limit. This limit varies with the type of reactor, but is about 1300° F. in the particular example. Also, if some other source of heat other than a nuclear reactor (for example, geothermal) is used, the temperature available might be appreciably different. The circulating medium, which is preferably helium, then flows through two parallel circuits 10 and 11, the first being through a superheater SH and the second through a reheater RH. The superheater and reheater are heat exchangers in which heat is rejected from the helium to steam in the Rankine cycle. The circuits 10 and 11 join in a line 13 by which the partially cooled helium at about 850° F. is led to a heating pass 14 in the second heater H2. The heater H2 is a combustion type heater to which fuel is supplied under suitable control through a line 15. It is, of course, capable of operation at high temperature and preferably raises the helium gas to about 1800° F. The helium then flows through line 17 to the compressor turbine CT and from this turbine through line 18 to a power output turbine PT. The power output turbine is coupled by shafting to a driven device such as an alternator 19. With respect to the rotating machinery, it is clear that the two turbines may be combined or connected by shafting and the compressors may be combined or the number of compressors may be reduced. However, the configuration described is that considered most efficient and practical.

The expanded helium gas is discharged through a line 21 to a heat exchanger 22 which is one of a number of preheaters in the water circuit. From this preheater, the gas flows through conduit 23 to the cooling pass of the regenerator R where it gives up heat to the helium flowing to the first heater. Thereafter, the helium returns to the compressors through line 24, a heat exchanger 25, and line 26. Heat exchanger 25 is also a preheater in the water circuit.

Heat is taken from the helium in the intercoolers 5 and 6 by combustion air and is thus recovered in the heater H2. As shown, combustion air circulates through these intercoolers and through ducting 29, a recuperator 30 exposed to stack gases of the heater, and ducting 31 to the combustion air inlet of heater H2.

The operation of the gas circuit should be clear to those skilled in the art but, in short, the heated compressed gas energizes the turbines to drive the compressor and to do useful work and the expanded gas is cooled in the water preheaters and regenerator and again compressed. Further discussion of the gas cycle will be deferred until the Rankine water circuit has been outlined.

We may consider the water circuit as starting at the condenser C in which steam discharged from the turbines is condensed to water by a cooling medium, such as cold water circulated through the condenser by a pump 37. The condensate at about 75° F. is pumped by a feed water pump 38 to heat exchanger 25 in which the water is heated to some extent and then is delivered by pump 39 to a mixing preheater M. From the mixing preheater, the further heated water is delivered by a pump 41 through line 42 to a preheating coil 43 in the second heater. From this, the water proceeds to pump 45 which raises the water to the maximum pressure of the Rankine cycle, 1800 p.s.i., and forces it through the heat exchanger 22 where it is further heated to its boiling point, 621° F., by the helium gas. The water then flows to the evaporator or boiler 46 in heater H2. The steam generated in the evaporator flows through line 47, the superheater SH, line 49 and the high pressure steam turbine T1. Steam from T1 is circulated through line 51, reheater RH, where it is heated by the helium, and line 53 to the intermediate pressure turbine T2. The steam is superheated and reheated to about 1050° F. The major part of the steam expanded in the intermediate pressure turbine is fed through conduit 54 to the low pressure turbine T3. The fully expanded steam is discharged from turbine T3 through a duct 57 to the condenser C, completing the circuit. Some of the discharge from the intermediate pressure turbine, preferably about thirty percent, is diverted through line 58 to the mixing preheater M where it is mixed with and heats the feed water supplied from the condenser through preheater 25 and pump 39. This completes the steam circuit. Preferably, as illustrated, the three steam turbines are coupled by shafting to a power receiving device or devices, such as an alternator 55.

Operation

Considering now the operation of the integrated system with illustrative values for temperature, we may consider that the helium enters the compressors at about 88° F. and leaves the compressors at about 175° F. It is heated in the regenerator R to about 975° F. and then in the heater H1 to about 1300° F. The helium is cooled to about 855° F. in passing through the superheater and reheater and is brought to its maximum temperature of some 1800° F. in the heating coil 14. The gas expands in the two turbines and is then cooled at constant pressure prior to reentry into the compressors. The preferred pressure ratio in the helium cycle is about three to one. The pressure level may be varied as a means of control of the plant, with the maximum pressure preferably ranging from about 150 p.s.i. to about 500 p.s.i.

The water leaves the condenser at about 75° F. and is gradually pressurized and heated as it flows through pump 38, preheater 25, mixing preheater M, pump 41, preheater 43, pump 45, and preheater 22; pump 45 finally raising the water pressure to 1800 p.s.i. and preheater 22 the temperature to 621° F., the water thus being at the boiling point at this pressure. The water is evaporated into saturated steam in the heating coil 46 and is heated to 1050° F. in the superheater before entering turbine T1 and again to this temperature in the reheater RH before entering turbine T2. Approximately seventy percent of the discharge from turbine T2 flows through the low pressure turbine T3 and is discharged to the condenser at about 2″ Hg. Thirty percent of the steam is diverted to the mixing preheater principally to reduce the size of the low pressure turbine. The heat content of this steam is recovered in the mixing preheater.

It will be understood that the specific values of temperatures and pressures mentioned above are illustrative, and that variations may be made to secure a desired balance of the system. Of course, the actual values of some of the factors in the system would change as it is adjusted to meet varying loads.

The power output of the system may be varied by varying the heat input to the fuel heater H2 and by varying the output of the nuclear or other heater H1. Particularly if a nuclear reactor is used, it is desirable to keep it operating as far as possible at constant power level and to effect adjustments by varying the amount of fuel consumed in heater H2. The system may also be adjusted by varying the overall pressure level of the helium. If the alternators 19 and 55 are connected to the usual power system, they will determine the speed of the gas power turbine and the steam turbines. However, the gas compressors and turbine CT may vary in speed in accordance with conditions in the system.

Because of the large temperature range of the power plant, from, 1800° F. down to approximately 75° F., there is a very high theoretical efficiency. We believe that in practice about 55 percent overall cycle efficiency can be obtained, which is higher than the efficiency of gas or steam turbine plants of which we are aware.

The detailed description of the preferred embodiment of the invention for the purpose of explaining the principles thereof is not to be considered as limiting or restricting the invention, as many modifications may be made by the exercise of skill in the art.

We claim:
1. A thermal power plant combining a closed circuit Brayton cycle plant and a closed circuit Rankine cycle plant,
   the Brayton cycle plant comprising a compressor, heating means, expander means driving the compressor, and cooling means,
   the Rankine cycle plant comprising liquid pumping means, heating means including a preheater, an evaporator, and a superheater, expander means providing useful work, and a condenser,
   the heating means for the two cycles comprising a first heater in the Brayton cycle and a second heater, having a higher temperature capability than the first heater, in both cycles,
   the power plant being characterized by means for rejecting heat from the Brayton cycle to the Rankine cycle.

2. A thermal power plant as recited in claim 1 in which the last-recited means includes means for rejecting heat from the said cooling means to the said preheater.

3. A thermal power plant as recited in claim 2 in which the said cooling means and preheater comprise heat exchangers common to both cycles, one heat exchanger being adjacent to an outlet of the expander means in the Brayton cycle plant and an inlet to the evaporator in the Rankine cycle plant and the other being adjacent to an inlet to the compressor in the Brayton cycle plant and an outlet of the condenser in the Rankine cycle plant.

4. A thermal power plant as recited in claim 3 in which the Brayton cycle plant cooling means includes a regenerator connected to the gas circuit between the said heat exchangers.

5. A thermal power plant as recited in claim 1 in which the Brayton cycle plant comprises, in flow sequence, the first heater, means for heating steam in the Rankine cycle plant, and the second heater.

6. A thermal power plant as recited in claim 5 in which the steam heating means includes a superheater.

7. A thermal power plant as recited in claim 6 in which the steam heating means includes a reheater.

8. A thermal power plant as recited in claim 1 in which the last-recited means includes a compressor intercooler in the Brayton cycle and means for conducting heat from the intercooler to the working medium of the Rankine cycle.

9. A thermal power plant as recited in claim 8 in which the second heater is a combustion heater and the plant includes means for heating combustion air by the intercooler.

10. A thermal power plant as recited in claim 1 in which the Brayton cycle expander means is coupled to external load means to deliver useful work from the power plant.

11. A thermal power plant combining gas and vapor circuits comprising, in combination,
   a first heater having a predetermined relatively low maximum temperature,
   a second, fuel, heater having a higher maximum temperature than the first heater,
   the gas circuit comprising compressor means and intercooler means in circuit with the compressor means,
   the power plant including a circuit for conducting combustion air to the second heater through the intercooler means,
   the gas circuit further comprising, in flow series from the compressor means, the heating pass of a regenerator,
   the first heater,
   a superheater and a reheater in the vapor circuit,
   gas heating means in the second heater,
   gas turbine means coupled to drive the said compressor means and adapted to drive an external load,
   the cooling pass of a first heat exchanger,
   the cooling pass of the said regenerator,
   the cooling pass of a second heat exchanger, and a return conduit to the compressor means;
the vapor circuit comprising, in flow series, a condenser,
the heating pass of the second heat exchanger,
a first preheater,
a second preheater energized by the second heater,
the heating pass of the first heat exchanger,
vapor generating means in the second heater,
the said superheater,
a high pressure turbine,
the said reheater,
an intermediate pressure turbine, and
a low pressure turbine discharging to the said condenser,
the said high, intermediate, and low pressure turbines being adapted to deliver energy to one or more external loads.

References Cited

UNITED STATES PATENTS 3,043,763   7/1962   Spillmann _____ 60—70

CARROLL B. DORITY, Jr., Primary Examiner

U.S. Cl. X.R.

60—70, 73, 102